United States Patent [19]
Choi

[11] Patent Number: 5,658,007
[45] Date of Patent: Aug. 19, 1997

[54] BUFFER APPARATUS FOR AUTOMOBILE

[76] Inventor: Yun-Sik Choi, 22-12, Shinweol 5-Dong, Yangcheon-ku, Seoul 158-095, Rep. of Korea

[21] Appl. No.: 592,410
[22] PCT Filed: Jul. 20, 1994
[86] PCT No.: PCT/KR94/00096
  § 371 Date: Apr. 22, 1996
  § 102(e) Date: Apr. 22, 1996
[87] PCT Pub. No.: WO95/03185
  PCT Pub. Date: Feb. 2, 1995

[30] Foreign Application Priority Data

Jul. 21, 1993 [KR] Rep. of Korea ............... 1993/13524U

[51] Int. Cl.$^6$ ..................................................... B60G 21/00
[52] U.S. Cl. ............................................ 280/689; 280/718
[58] Field of Search ...................................... 280/699, 688, 280/689, 718

[56] References Cited

U.S. PATENT DOCUMENTS

| | | |
|---|---|---|
| 2,933,328 | 4/1960 | McIntyre et al. ........................ 280/724 |
| 3,675,941 | 7/1972 | Scheublein et al. ..................... 280/723 |
| 4,133,554 | 1/1979 | Lampert ................................. 280/689 |
| 4,681,343 | 7/1987 | Gallet et al. ............................ 280/699 |

*Primary Examiner*—Paul N. Dickson
*Attorney, Agent, or Firm*—Armstrong, Westerman, Hattori, McLeland & Naughton

[57] ABSTRACT

A buffer apparatus mounted on a torsion axle for preventing a rolling of an automobile. A spring having an upper elastic bar and a lower elastic bar is supported at a hinge pin fixed to a chassis. The lower elastic bar is positioned below the chassis and the upper elastic bar is positioned on a rubber roller rotatably inserted on a middle portion of an U-shaped bar. The U-shaped is pivotally connected to the chassis. A roller fence surrounding the roller is secured to the middle portion of the U-shaped bar. A vertical connecting rod is pivotally connected between a middle portion of the roller fence and a torsion axle. The upper elastic bar restricts an upward movement of the roller and the lower elastic bar supports the chassis to cause the automobile to be traveled under a stable condition.

2 Claims, 3 Drawing Sheets

BUFFER APPARATUS FOR AUTOMOBILE

BACKGROUND OF THE INVENTION

1. Field of the Invention

The present invention relates to a buffer apparatus for an automobile, and more particularly to a buffer apparatus for an automobile which is simple in structure and mounted on a torsion axle to prevent a rolling of an automobile.

2. Description of the Prior Art

Referring to FIG. 1, there is shown a general buffer apparatus for an automobile. As showing in the drawing, the buffer apparatus ha a coil spring mounted between a chassis and a torsion axle. In the buffer apparatus shown in the drawing, a shock applied to a wheel of an automobile is transmitted to the chassis through the coil spring. Since the shock is however absorbed at the chassis, shock absorbing capability is low and also rolling of an automobile body is still generated, thereby providing poor riding feeling.

A buffer apparatus for an automobile for overcoming the above-mentioned problems is disclosed in Korean Utility Model Publication No. 9688/1990. FIG. 2 shows the buffer apparatus disclosed in the publication. As shown in the drawing, the buffer apparatus comprises a first coil spring mounted on a torsion axle and protruded upward which is adapted to absorb a vertical shock and to transmit the shock to the chassis, a crank plate placed between a chassis and the torsion axle and secured at its free end to an upper end of the first coil spring, and a second coil spring mounted between the chassis and the crank plate which is adapted to absorb a horizontal shock and to transmit the shock to the chassis. In the buffer, a shock applied to the torsion axle is firstly absorbed by the first coil spring in its vertical component and further absorbed by the second coil spring in its horizontal component. That is, the buffer is designed to transmit a vertical shock applied thereto to a side wall of the chassis in order to cause riding feeling to be enhanced.

However, since the first and second coil springs are positioned at a right angle with reference to each other, breakages of the coil springs and the crank plate are frequently occurred. In order to prevent the breakages, coil springs and crank plate having high strength must be used, thereby causing the manufacturing cost to be heightened.

SUMMARY OF THE INVENTION

The present invention has been made in view of the above-described problems occurring in the prior art and an object of the invention is to provide a buffer apparatus for an automobile which comprises a simple spring mounted a torsion axle and which is adapted to cause a wheel of the automobile to be in contact with the ground always and to prevent rolling phenomenon of the automobile.

Another object of the present invention is to provide a buffer which is adapted to transmit back a shock applied to a wheel and a load by weight of an automobile not to a chassis but to a torsion axle to improve riding feeling.

In accordance with an embodiment of the present invention, the objects mentioned above can be accomplished by providing a buffer apparatus for an automobile comprising: an U-shaped bar pivotally connected to a chassis at its both ends and having a rotatable roller inserted in a middle portion thereof; a spring having a lower elastic bar extended from a hinge portion and fixed to a chassis and an upper elastic bar extended from the hinge portion and positioned between the chassis and a torsion axle, the upper end of the upper elastic bar being disposed in the U-shaped bar and in contact with the roller by elasticity of the spring; a hinge pin fixed to the chassis and connected to the hinge portion of the spring; and a connecting rod pivotally connected between a middle portion of the U-shaped bar and a torsion axle; whereby the upper elastic bar restricts an upward movement of the roller and the lower elastic bar supports the chassis so as not to allow vibration of the torsion axle to be transmitted to the chassis.

In accordance with another embodiment of the invention, the connecting rod may be a shock absorber.

In accordance with still another embodiment of the invention, the invention provides a buffer apparatus for an automobile comprising: a supporting rod erected from a torsion axle; a guide bar mounted between a chassis and the torsion axle; and a coil spring fixed to an inner portion of the torsion axle at its inner end and to an upper end of the supporting rod at its outer end.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Embodiments according to a buffer apparatus of the present invention will be described with reference to the accompanying drawings hereinafter.

Figure 1:
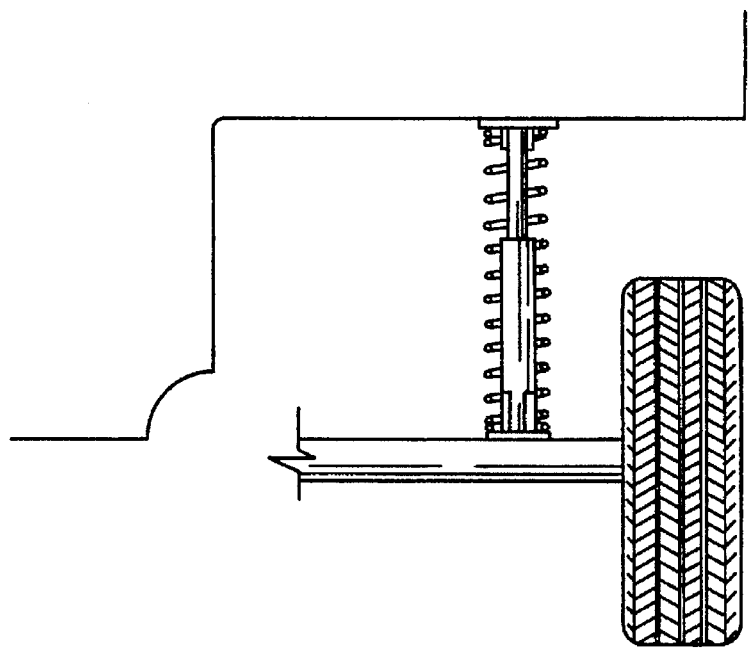
FIG. 1 is a schematic sectional view of a conventional buffer apparatus.
Figure 2:
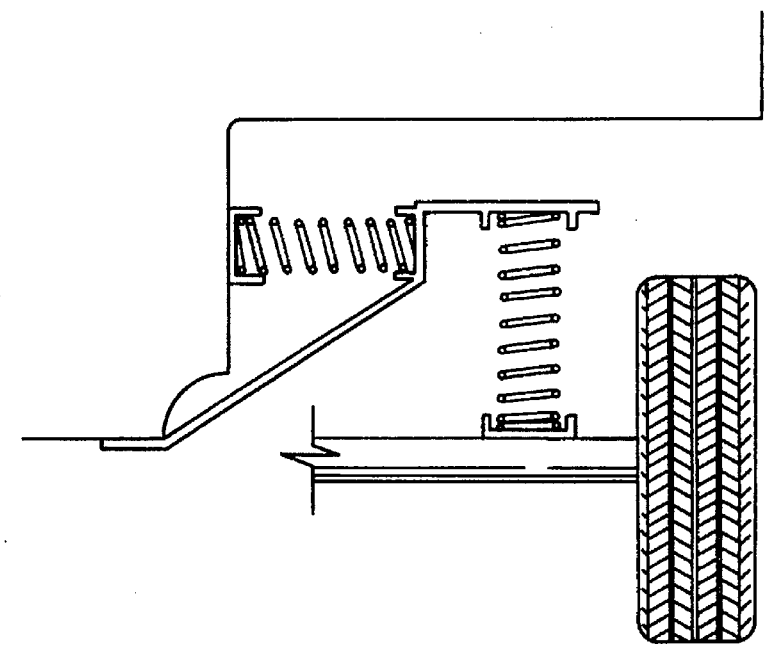
FIG. 2 is a schematic sectional view of another conventional buffer apparatus.
Figure 3:
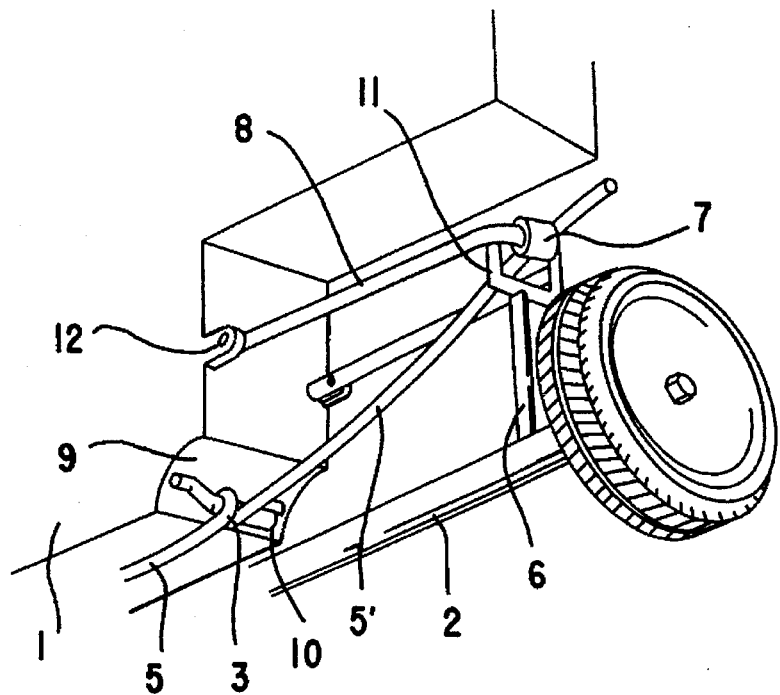
FIG. 3 is a perspective view of a buffer apparatus according to the present invention.

Referring to FIG. 3, there is shown a buffer apparatus according to an embodiment of the invention. As shown in the drawing, a spring having an upper elastic bar and a lower elastic bar is supported at a hinge pin 10 fixed to a curved portion of a chassis 1. The lower elastic bar 5 is positioned below the chassis 1 and the upper elastic bar 5' is positioned on a roller 7 rotatably inserted on a middle portion of an U-shaped bar 8. The U-shaped bar 8 is connected to the chassis by connecting means such as a hinge or a pin. The roller 7 is preferably made of rubber material. A roller fence 11 surrounding the roller is secured to the middle portion of the U-shaped bar 8 at its both ends. A vertical connecting rod 6 is pivotally connected to a middle portion of the roller fence 11 at its upper end and fixed to a torsion axle 2 at its lower end.

Even though the upper elastic bar 5' collides with and rubs against the roller 7 rotatably mounted on the middle portion of the U-shaped bar 8, noise is not generated because the roller 7 is made of rubber material.

The hinge pin 10 is fixed to the curved portion of the chassis by means of screw or weld and inserted in a coil portion of the spring 3.

Figure 4:
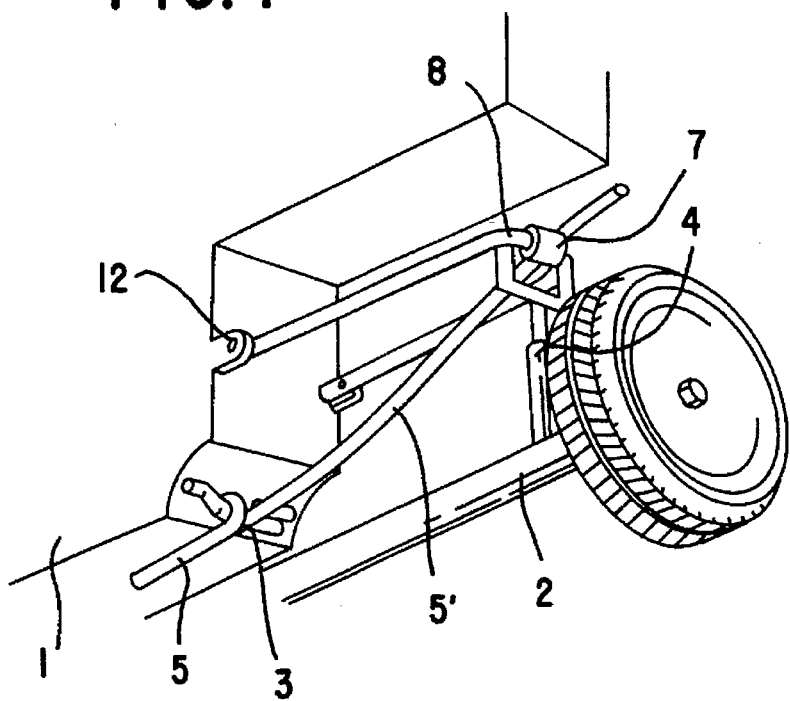
FIG. 4 is a perspective view of a buffer apparatus according to another embodiment of the invention.

Referring to FIG. 4, there is shown another embodiment of the invention. According to the embodiment shown in FIG. 4, the connecting rod 6 of the present invention may be a shock absorber 4.

In operation of the above-mentioned buffer, since the roller 7 rolls freely along a contact line of the upper elastic bar 5', a shock applied to a wheel is not directly transmitted to the chassis 1. That is, when a shock is applied to a tire because of an uneven surface of road, the connecting rod 8 pushes the U-shaped bar 8 upward but the elasticity of the upper elastic bar 5' causes immediately the U-shaped bar 8 to be lowered back to the original position. Accordingly, the shock applied to the tire is not directly transmitted to the chassis 1.

When weight of the automobile is light, the lower elastic bar is raised toward the chassis 1 and the U-shaped bar 8 is positioned at a middle portion remote from the end of the upper elastic bar 5', i.e., at a location between the end of the upper elastic bar 5' and the coil portion of the spring 3. On the other hand, when weight of the automobile is heavy, the lower elastic bar 5 is lowered and the and the U-shaped bar 8 is positioned at the end of the upper elastic bar 5'. Hence, the spring 3 exerts a fixed elastic force regardless of the weight of the automobile and thus a nearly fixed pressure is transmitted to the coil portion of the spring 3 by correlative action of the upper and lower elastic bars 5' and 5 regardless of the weight of the automobile.

Since the upper elastic bar 5' of the spring 3 always pushes the U-shaped bar 8 downward, the U-shaped bar 8 is immediately lowered after it is raised upward due to a shock, so that the shock is absorbed not at the chassis 1 but at the coil portion of the spring 3. More specifically stated, since the lower elastic bar 5 of the spring 3 is fixed to the chassis 1 to support the chassis 1 and the upper elastic bar 5' continuously exerts its elastic force downward, a shock applied to a wheel is not transmitted to another wheel but vanished. Hence, the automobile can always travel in stable and fixed state.

Accordingly, there is not a shock vertically transmitted to the chassis which may be generally generated in a known automobile, and the automobile can always travel in stable and fixed state. Furthermore, since the upper elastic bar 5' always pushes the U-shaped bar 8 downward by its elastic force, the buffer apparatus of the invention can overcome the problem in that a tire is separated from a road surface during travel because of an uneven surface of the road and also the automobile can travel under the condition that its tires are in contact with the road surface, thereby alleviating a shock applied to the chassis.

As mentioned above, since the lower elastic bar 5 is fixed to the chassis 1 to support the chassis and the upper elastic bar 5' pushes the U-shaped bar 8, the automobile having the buffer of the invention can comfortably travel without rolling even during turning sharply.

Figure 5:
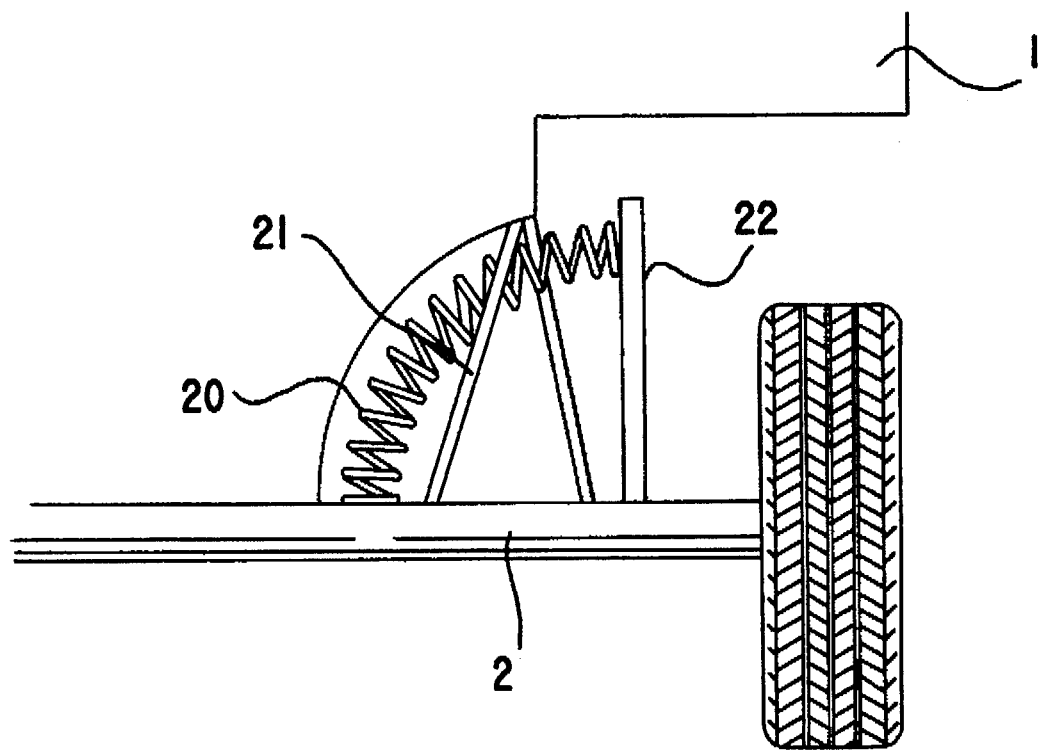
FIG. 5 is a side view of a buffer apparatus according to still another embodiment of the invention.

Referring to FIG. 5, there is shown a buffer apparatus according to still another embodiment of the invention. As shown in the drawing, the buffer apparatus comprises a supporting rod 22 erected from a torsion axle 2, a guide bar 21 mounted between a chassis 1 and the torsion axle 2, and a coil spring 20 fixed to an inner portion of the torsion axle 2 at its inner end and to an upper end of the supporting rod 22 at its outer end.

In the embodiment shown in FIG. 5, a shock applied to a wheel and a load due to weight of the automobile are partially absorbed by the coil spring 20 without being directly transmitted to the chassis and are returned to the torsion axle 2.

As apparent from the above description, since the spring of the buffer apparatus always pushes the U-shaped bar downward and thus the connecting rod to cause the wheel to be in contact with the ground, a shock applied to the wheel is not transmitted to the chassis but absorbed at the spring and transmitted back to the torsion axle, thereby improving riding feeling and preventing rolling of an automobile.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A buffer apparatus for an automobile comprising:

a U-shaped bar pivotally connected to a chassis at both ends and having a rotatable roller inserted in a middle portion thereof;

a spring fixed to said chassis and having a lower elastic bar extending from a hinge portion and an upper elastic bar extending from the hinge portion and positioned between the chassis and a torsion axle, an upper end of the upper elastic bar being disposed in the U-shaped bar and in contact with the roller by elasticity of the spring;

a hinge pin fixed to the chassis and connected to the hinge portion of the spring; and a connecting rod pivotally connected between the middle portion of the U-shaped bar and the torsion axle;

whereby the upper elastic bar restricts an upper movement of the roller and the lower elastic bar supports the chassis so as not to allow vibration of the torsion axle to be transmitted to the chassis.

2. A buffer apparatus according to claim 1, wherein the connecting rod is a shock absorber.

* * * * *